United States Patent [19]

Giles

[11] Patent Number: 4,854,765
[45] Date of Patent: Aug. 8, 1989

[54] REVERSIBLE THERMAL COMPENSATION JOINT

[75] Inventor: Daniel N. Giles, Seattle, Wash.
[73] Assignee: The Boeing Company, Seattle, Wash.
[21] Appl. No.: 72,512
[22] Filed: Jul. 13, 1987
[51] Int. Cl.[4] .......................... F16B 1/00; F16B 17/00
[52] U.S. Cl. ...................................... 403/30; 403/352; 403/379
[58] Field of Search ............... 403/378, 379, 369, 371, 403/306, 334, 300, 30, 28, 29, 326, 365, 310, 311, DIG. 7, 352, 261; 277/26, 236

[56] References Cited

U.S. PATENT DOCUMENTS

| | | |
|---|---|---|
| 2,297,508 | 9/1942 | Schütte . |
| 2,662,725 | 12/1953 | McVeigh . |
| 3,172,689 | 3/1965 | Glaser . |
| 3,353,852 | 7/1965 | Wood .................................. 403/190 |
| 3,454,313 | 7/1969 | Lohneis . |
| 3,552,775 | 3/1968 | Warner ................................ 403/378 |
| 3,666,302 | 5/1972 | Kellett .................................. 403/28 |
| 4,047,600 | 9/1977 | Maitland . |
| 4,098,476 | 7/1978 | Jutte et al. . |
| 4,167,351 | 9/1979 | Bindin . |
| 4,281,941 | 8/1981 | Rottenkolber . |
| 4,299,018 | 11/1981 | Bickerstaff et al. ................... 403/30 |

Primary Examiner—Randolph A. Reese
Assistant Examiner—Carol I. Bordas
Attorney, Agent, or Firm—Christensen, O'Connor, Johnson & Kindness

[57] ABSTRACT

A reversible thermal compensation joint having a ceramic fairing (20) with a spindle (24) slidably engaged within a metal hinge housing (22). The spindle (24) has a groove (28) with inwardly converging side walls (36) and a flat bottom (38) in which is seated a plurality of arcuate ring sections (30). The ring sections (30) have inwardly converging sides (40) that substantially match the side walls (36) of the groove (28). The ring sections (30) are formed of the same material as the hinge housing (22), such that upon thermal expansion of the reversible thermal compensation joint (10), the ring sections (30) slide up the walls (36) to maintain a tight fit with the expanding hinge housing (22).

2 Claims, 3 Drawing Sheets

REVERSIBLE THERMAL COMPENSATION JOINT

FIELD OF INVENTION

This invention pertains to thermal compensation joints, and, more particularly, to thermal compensation joints for maintaining a tight fit between tructural members having dissimilar coefficients of thermal expansion.

BACKGROUND OF THE INVENTION

Maintaining a tight fit between materials having dissimilar coefficients of thermal expansion is a difficult problem, particularly when the assembly must operate at significantly different temperatures than the temperature at which it was assembled. The difference in the coefficient of thermal expansion of the two materials means that a joint assembled at room temperature, for example, will either loosen up or suffer high thermal stresses when exposed to high temperatures. The invention described herein is a method of compensating for the difference in the coefficient of thermal expansion in two materials. The following description of the invention as it applies to missile fins having ceramic leading edges should be considered an example only, as the invention may have other end uses as well.

Because of the high temperatures they must endure during flight, it is desirable to form the leading edges of missile fins from ceramic material. It is also desirable that the outboard section of the fin be movable from a stowed position (during transportation to a launch site) to a deployed position (during flight). In order to accomplish these objectives, hinged missile fins that have ceramic leading edges require a mechanism for attaching a ceramic fairing to a metallic hinge structure. This requires a joint between the ceramic material and the metallic hinge that has the ability to transmit a cantilever load from the fairing to the missile structure when the missile fin is moved from a stored position to a deployed position. The joint must be compact and involve no external fastener that cannot be hidden in the deployed position. In order to avoid damage and malfunction of the missile, it is important that there be no play in the joint during transportation of the missile to the launch site or during the flight of the missile. Because aerodynamic heating will subject the joint to a large increase in temperature during flight, the differences in the coefficient of expansion will result in the metallic part of the joint expanding at a faster rate than the ceramic part. In the absence of a structure for compensating for this difference, the joint will loosen and the fin will become unstable. This will result in damage to the fin and possible destruction of the missile.

SUMMARY OF THE INVENTION

The present invention overcomes the foregoing and other disadvantages by providing a reversible thermal compensation joint for joining first and second structural members having dissimilar coefficients of thermal expansion, and where the second member expands faster than the first structural member. The compensation joint comprises a protrusion formed on the first structural member and a cavity formed in the second structural member for slidably receiving the protrusion. A groove having inwardly converging sides and a bottom surface circumscribes the exterior surface of the protrusion. The inwardly converging sides form an angle having an apex that is coincident with the longitudinal axis of the protrusion. A plurality of expansion members are seated within the groove and are contructed of material having the same coefficient of expansion as the second structural member. Each expansion member has a trapezoidal cross-sectional configuration with converging sides that cooperate with the sides of the groove so that upon heating of the compensation joint the expansion members slide up the sides of the groove to maintain a tight fit between the projection and the second structural member. More specifically, a tight fit is maintained between the abutting surfaces of the expansion members and the second structural member and between the inwardly converging sides of the groove and the expansion members. A separate coupling mechanism is provided for coupling the first and second structural members together.

In accordance with other aspects of the invention, the protrusion and the cavity are cylindrical and the expansion members comprise arcuate ring sections, preferably two arcuate ring sections, each having an arc that is slightly less than one half the circumference of the protrusion.

In accordance with still further aspects of the invention, the separate coupling mechanism comprises a transverse retaining pin inserted through an opening formed in the second structural member and an opening formed in the protrusion to thereby couple the second structural member to the first structural member. The retaining pin lies between the arcuate ring sections.

As is evident from the foregoing description, the geometry of a thermal expansion joint formed in accordance with the present invention allows the arcuate ring sections to expand and slide up the sides of the walls of the groove in the first structural member. The expansion and movement of the arcuate ring sections fills in the gap that is created by the thermal expansion of the second structural member and maintains a tight fit between the first and second structural members. Because the process is reversible, the assembly can be brought back down to assembly, i.e., room, temperature without locking up or causing damage to either of the structural members.

BRIEF DESCRIPTION OF THE DRAWINGS

The foregoing and other advantages and features of the present invention will be better understood from the following description of the preferred embodiment of the invention when taken in conjunction with the following drawings, wherein.

DETAILED DESCRIPTION OF THE PREFERRED EMBODIMENT

Figure 1:
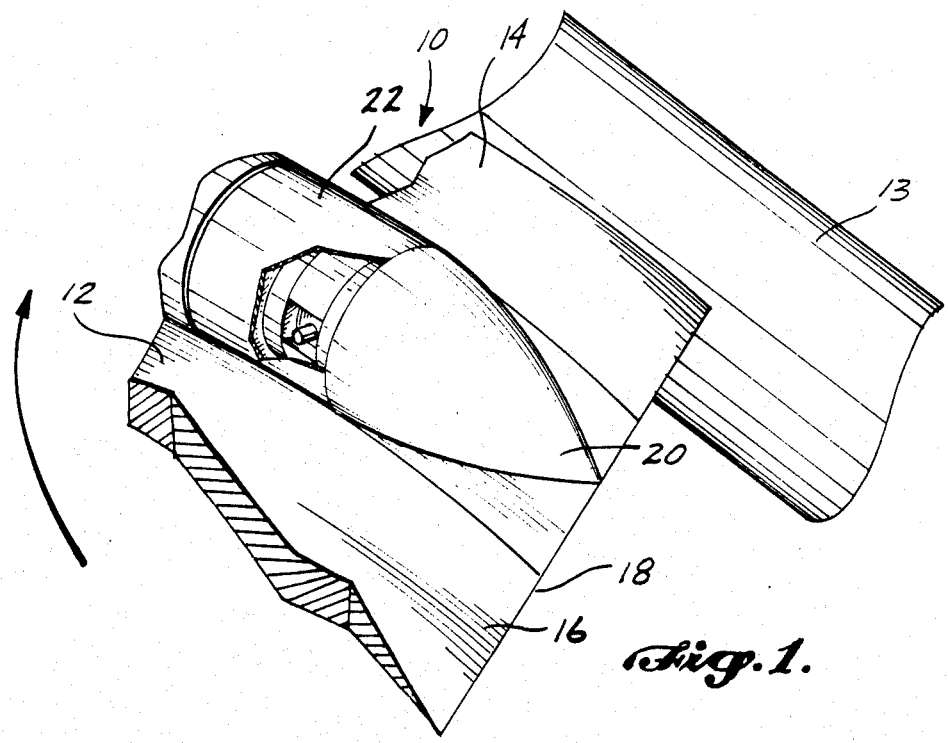
FIG. 1 is an isometric cut-away view of the present invention as applied to a missile fin.

FIG. 1 shows a cut-away view of a reversible thermal compensation joint 10 formed in accordance with the present invention in use on a missile fin 12. The fin 12 has a fixed inboard section 14 that is attached to a missile body 13, and a movable outboard section 16 rotatably attached to the inboard section 14 by an integral hinge structure (not shown). Prior to deployment, the outboard section 16 is folded over the inboard section 14 in a stored position. Upon deployment, the outboard section 16 rotates about the integral hinge to the extended position shown in FIG. 1.

Because of the heat created when the missile flies through the atmosphere (commonly called aerodynamic heating), the lead edge 18 and the center fairing 20 of the missile fin 12 are typically constructed of ceramic material. Contrariwise, structural requirements necessitate that the hinge housing 22 and related hinge structure be formed of metal. During flight, when the missile fin structures are subjected to high temperatures produced by aerodynamic heating, the difference in the coefficient of thermal expansion of the ceramic fairing 20 and the metallic hinge housing 22 will result in the hinge housing 22 expanding to a greater degree than the fairing 20. This differential expansion will cause looseness and play between the structures in the absence of a compensation mechanism. The thermal compensation joint 10 of the present invention provides a metal to ceramic joint that compensates for these dimensional changes and maintains a tight fit between the fairing 20 and the hinge housing 22 over the range of temperatures that these elements are subjected to during the flight of the missile.

Figure 2:
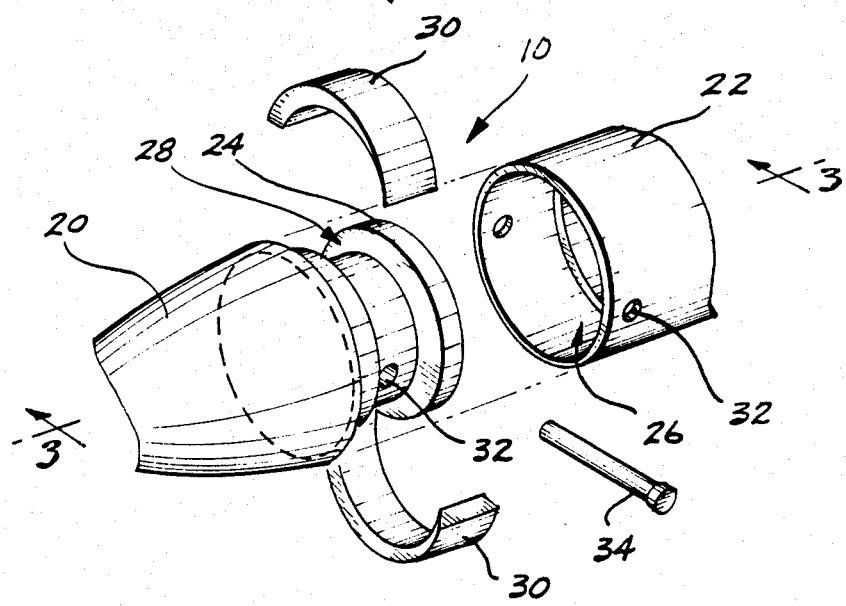
FIG. 2 is an isometric exploded view of the reversible thermal compensation joint of FIG. 1.

FIG. 2 shows the reversible thermal compensation joint 10 with the fairing 20 disassembled from the hinge housing 22. Located at the inboard end of the fairing 20 is a projection in the form of a spindle 24. Preferably, the spindle 24 is integrally formed with the fairing 20 and is sized to be slidably received within an open end 26 of the hinge housing 22 and to have a snug fit at ambient temperatuers. A groove 28 is formed about the circumference of the spindle 24, and two arcuate ring sections 30 are seated within the groove 28. Openings 32 are formed in the hinge housing 22 and the spindle 24. Each ring section 30 has an arc of less than one-half the circumference of the spindle 24 to avoid interference between the ring sections 30 and with the openings 32. After the ring sections 30 are seated in the groove 28, the spindle 24 is slid within the hinge housing 22 and a retaining pin 34 is inserted through the openings 32. The retaining pin 34 holds the fairing 20 and the hinge housing 22 together without interfering with the movement of the ring sections 30.

Figure 3:
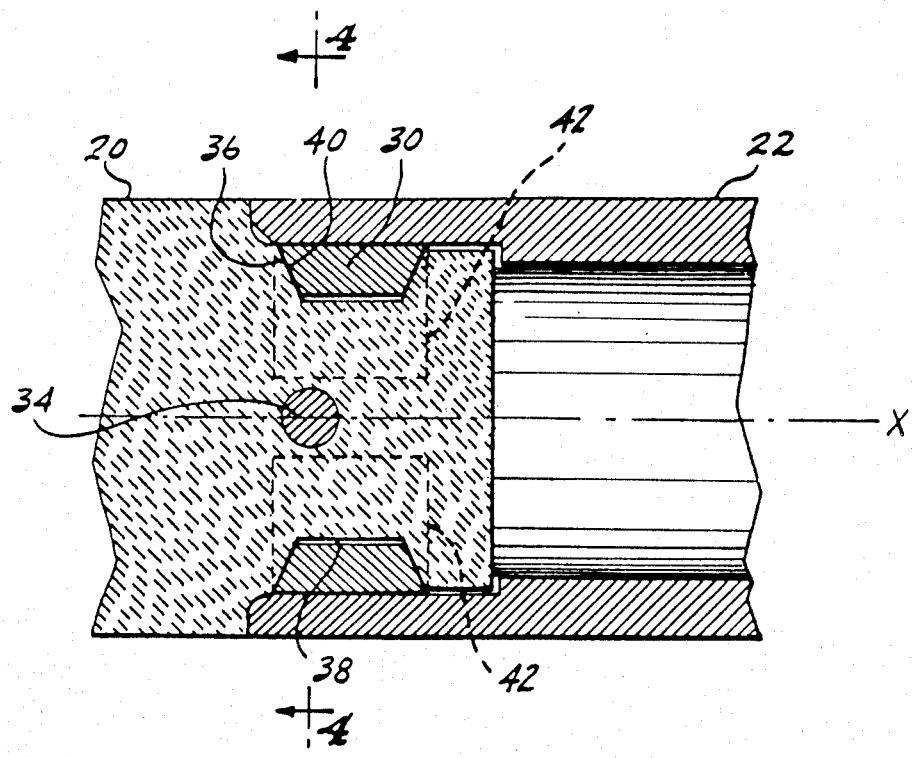
FIG. 3 is a sectional view of the present invention taken along lines 3—3 in FIG. 2.
Figure 4:
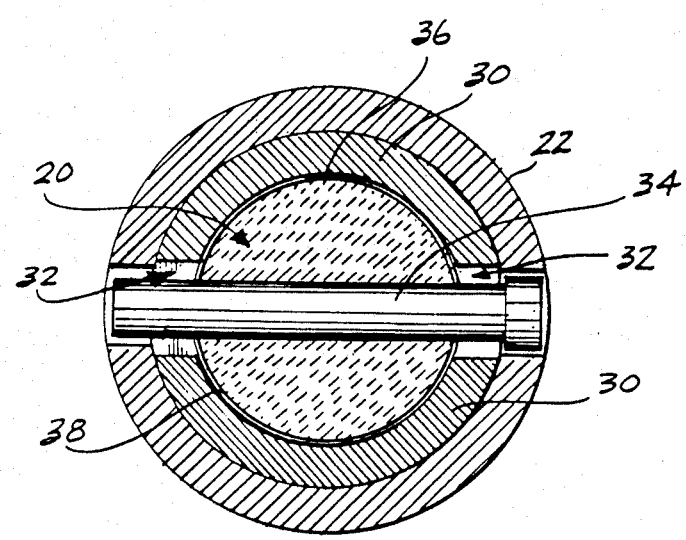
FIG. 4 is a cross-sectional view of the present invention taken along lines 4—4 in FIG. 3.

FIGS. 3 and 4 are cross-sectional views showing the internal details of the assembled reversible thermal compensation joint 10. The spindle 24 is slidably engaged within the hinge housing 22 with little or no clearance fit. As shown in FIGS. 2 and 3, the groove 28 is formed to have inwardly converging side walls 36 and a flat bottom 38. The arcuate ring sections 30 have a trapezoidal cross-sectional configuration with inwardly converging sides 40 that substantially match the side walls 36 of the groove 28. In other words, the angle formed by the ring section sides 40 with respect to each other is substantially the same as the angle formed by the groove side walls 36 with respect to each other. The phantom lines 42 in FIG. 3 show the arc of each of the ring sections 30 being less than one-half the circumference to permit insertion of the retaining pin 34 within the opening 32. The ring sections are ideally made of the same material as the hinge housing, or of material having the same coefficient of thermal expansion as the hinge housing 22. In addition, the ring section material must be isotropic, i.e., expand equally in all directions.

Figure 5:
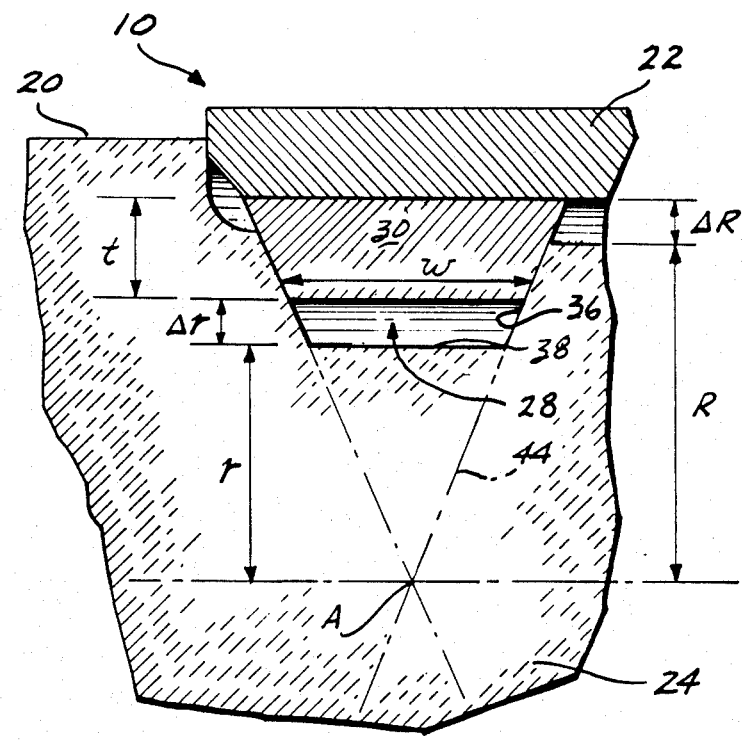
FIG. 5 is a sectioned, pictorial diagram showing the working geometry of the compensation joint in accordance with the present invention.

FIG. 5 is an enlarged pictorial diagram illustrating the working geometry of the reversible thermal compensation joint 10. More specifically, FIG. 5 shows the effect of thermal expansion on the hinge housing 22 and the ring section 30. The original inside radius R of the hinge housing 22 expands by an amount $\Delta R$, which is shown as the space created between the hinge housing 22 and the spindle 24. Thermal expansion also occurs in the ring sections 30; however, because the ring sections 30 are free bodies, they will only expand to partially fill the space $\Delta R$. In other words, since the ring sections 30 are not connected together as a solid ring, their outside diameter will not increase. Although the ring section 30 is constructed of isotropic material and will expand in thickness t, the increase in thickness will be much less than the increase in the radius $\Delta R$ of the hinge housig 22. As a result, the space between the hinge housing 22 and the spindle 24, represented by $\Delta R$, must be filled by the upward movement of the ring section 30 in the groove 28.

Upward movement of the ring section 30 is achieved by using the expansion of the width w of the ring section 30 to force the ring section 30 to ride up the inclined side walls 36 of the groove 28. The amount of upward movement of the ring section 30 in the groove 28 will be determined by the slope the side walls 36 and the expansion of the width of the ring section 30. With respect to the slope of the side walls 36, it is important to note that the expansion of the hinge housing 22 will be uniform with respect to the longitudinal axis of the hinge housing. In order to achieve uniformity of expansion of the ring section 30 and the hinge housing 22, the apex A of the cone formed by the side walls 36, as represented by the dotted lines 44, must lie on the longitudinal axis of the hinge housing. When this condition is met and the ring section is formed of the same material as the hinge housing, the expansion in the width w of the ring section 30 in combination with the slope of the side walls 36 will increase the inside radius $\Delta r$ of the ring section 30 by the amount $\Delta R$. As a result, the ring section 30 will maintain a right fit between the hinge housing 22 and the spindle 24.

As will be appreciated from the foregoing description, the working geometry of the present invention causes the ring sections to behave as if they were a solid body, thus maintaining a tight fit between the hinge housing and the fairing at all temperatures. In addition, when the joint cools, the ring sections will contract and slide back into the groove, thus preventing a buildup of compressive stress. The present invention allows structural members having dissimilar coefficients of thermal expansion to be connected together to maintain a tight fit in different temperature environments.

While a preferred embodiment of the invention has been illustrated and described, it will be appreciated that various changes can be made therein without departing from the scope and spirit of the invention. For instance,the spindle 24 and the hinge housing 22 may be formed to have a cross-sectional shape of a triangle, square, rectangle, or any other polygon. Furthermore, more than two ring sections may be used, especially if the cross-sectional configuration of the structure is other than a circle.

The embodiments of the invention in which an exclusive property or privilege is claimed are defined as follows:

1. A reversible thermal compensation joint for joining a first structural member to a second structural member, the first structural member being constructed of material having a lesser coefficient of thermal expansion than the second structural member, the compensation joint comprising:

(a) a cylindrical protrusion formed on the first structural member;

(b) a cavity formed in the second structural member for slidably receiving the protrusion;

(c) a groove circumscribing the exterior surface of said protrusion, said groove having inwardly converging sides and a bottom surface, the inwardly converging sides forming an angle having an apex that is coincident with the longitudinal axis of said protrusion;

(d) two arcuate ring sections, each of said arcuate ring sections having an arc that is less than one-half the circumference of said protrusion and each arcuate ring section being seated within said groove and constructed of material having the same coefficient of expansion as the second structural members, each expansion member having a trapezoidal cross-sectional configuration with two converging sides tha form an angle identical to the angle formed by the sides of said groove and that cooperate with the sides of said groove so that upon heating of the compensation joint, said expansion members expand to slide up the sides of said groove to maintain a tight fit between said projection and the second structural member; and (e) coupling means for coupling the first structural member to the second structural member.

2. The compensation joint of claim 1, wherein said coupling means comprises a retaining pin inserted through an opening formed in said second structural member and an opening formed in said protrusion to thereby couple said second structural member to said first structural member.

* * * * *